United States Patent [19]

Takahashi et al.

[11] Patent Number: 5,001,522
[45] Date of Patent: Mar. 19, 1991

[54] OPTICAL SEMICONDUCTOR DEVICE

[75] Inventors: Kosei Takahashi, Nara; Toshiro Hayakawa, Yokohama; Takahiro Suyama, Tenri; Masafumi Kondo, Nara, all of Japan

[73] Assignee: Sharp Kabushiki Kaisha, Osaka, Japan

[21] Appl. No.: 274,074

[22] Filed: Nov. 21, 1988

[30] Foreign Application Priority Data

Nov. 20, 1987 [JP] Japan .................. 62-294691

[51] Int. Cl.$^5$ .................................. H01L 33/00
[52] U.S. Cl. ........................ 357/16; 357/17; 357/60; 372/45
[58] Field of Search ............ 372/44, 45, 50, 8; 357/16, 17, 61, 60

[56] References Cited

U.S. PATENT DOCUMENTS 4,890,293 12/1989 Taneya et al. .................. 372/45
4,894,836 1/1990 Hayakawa et al. .............. 372/45

FOREIGN PATENT DOCUMENTS 01555802 9/1985 European Pat. Off. .
63-208296 8/1988 Japan .

OTHER PUBLICATIONS

Miller, D. A. B., et al., IEEE Journal of Quantum Electronics vol. QE-21, No. 9, Sep. 1985, pp. 1462-1476.
Nagai, H., et al., Japanese Journal of Applied Physics, vol. 25, No. 8, Aug. 1986, pp. L640-642.
Tsai, C. S., et al., IEEE Journal of Quantum Electronics vol. QE-14, No. 7, Jul. 1978, pp. 513-517.
European Search Report for EPC Application 88/310929.0, dated Mar. 26, 1990.
Miller et al., (Sep. 1985) Journal of Quantum Electronics, vol. QE-21, No. 9, "The Quantum Well Self-Electrooptic Effect Device: Optoelectronic Bistability and Oscillation, and Self-Linearized Modulation".

Primary Examiner—James W. Davie
Attorney, Agent, or Firm—Irell & Manella

[57] ABSTRACT

An optical semiconductor device is disclosed that comprises a quantum-well structure as an active region and exhibits a nonlinear optical effect with regard to light of energy near the band gap between the allowed band edges in the active region. The quantum-well structure of this device is composed of alternate layers consisting of at least one first semiconductor layer with a thickness smaller than the de Broglie wavelength of carriers and at least two second semiconductor layers with a band gap greater than that of the first semiconductor layer, the alternate layers being formed along a crystal orientation in the zinc-blende structure. The second semiconductor layers mentioned above are of an indirect transition type.

3 Claims, 6 Drawing Sheets

OPTICAL SEMICONDUCTOR DEVICE

BACKGROUND OF THE INVENTION

1. Field of the invention

This invention relates to an optical semiconductor device such as an optical modulator, an optical switch, and the like, which utilizes a nonlinear effect caused by excitons in the semiconductor layers thereof.

2. Description of the prior art

In recent years, optical semiconductor devices such as optical modulators, optical bistable devices, and the like have been extensively developed in order to realize superhigh speed optical communication, optical logic circuits, and the like. Of great interest as a means to achieve these objectives, there can be mentioned a device structure utilizing a quantum-well effect, in which tens to hundreds of two kinds of very thin semiconductor layers with different band gaps are alternately formed into a quantum-well structure. The term quantum-well structure used herein refers to a thin-layer structure composed of alternate layers consisting of first semiconductor layers with a thickness smaller than the de Broglie wavelength of about 200 Å to 300 Å with respect to electrons or holes and second semiconductor layers with a band gap greater than that of the first semiconductor layer. In recent years, epitaxial growth techniques such as molecular beam epitaxy (MBE), metal-organic chemical vapor deposition (MO-CVD), etc., have been developed, by which such a thin-layer structure can be produced readily.

Because each layer in the multiple quantum-well structure has a very small thickness, electrons and holes in the multiple quantum-well layer cannot move freely in the direction of thickness, so that they have a strong tendency to be confined two-dimensionally in the plane perpendicular to the direction of thickness. Moreover, the bound energy of an exciton into which an electron and a hole are bound together by their Coulombic attraction is increased because of the two-dimensional confinement of electrons and holes, so that excitons occur under heat energy at room temperature. There are proposed several optical semiconductor devices utilizing such excitons present at room temperature, which include an electric field effect optical modular. FIG. 6 shows a sectional view of a conventional electric field effect optical modulator, which is produced as follows: On a (100)-oriented n-GaAs substrate 60, an n-Al$_{0.3}$Ga$_{0.7}$As layer 61, a multiple quantum-well (MQW) layer (composed of alternate layers consisting of fifty undoped GaAs well layers 62 of a thickness of 100 Å each and forty-nine undoped Al$_{0.3}$Ga$_{0.7}$As barrier layers 63 of a thickness of 100 Å each), a p-Al$_{0.3}$Ga$_{0.7}$As layer 64, and a p-GaAs layer 65 are successively grown. Then, by photolithography and chemical etching techniques, the central portion of each of the n-GaAs substrate 60 and the p-GaAs layer 65 is removed into a circular shape with a diameter of 200 μm, resulting in circular windows 66. Next, an n-sided electrode 67 and a p-sided electrode 68 are formed on the back and upper faces of this device other than the circular windows, respectively.

FIG. 7 shows the band edges when an electric field is applied to the above-mentioned optical modulator, and FIG. 8 shows absorption spectra obtained when the optical modulator is irradiated with light through the circular window. When an appropriate forward voltage is applied across the p-n junction of the optical modulator, the multiple quantum well becomes flat as shown in FIG. 7a, and the wave functions of both electrons and holes in the conduction band and the valence band have a maximum value at the center of each of the well layers, so that the transition matrix element represented by the following formula (1) has a large value, resulting in large transition probability:

$$<\Psi_c|P|\Psi_v> \qquad (1)$$

where $\Psi_c$ and $\Psi_v$ are wave functions of electrons and holes in the first quantum state, respectively, and P is momentum operator. In contrast, when a reversed bias voltage is applied across the p-n junction, the band edges incline as shown in FIG. 7b, and the $\Psi_c$ and the $\Psi_v$ are biased in the opposite directions to each other, so that spacial overlaps between these wave functions become small. Therefore, the matrix element of the formula (1) has a small value, resulting in a reduction of transition probability. At the same time, the quantum states Ec and Ev of electrons and holes shift to the lower energy side. The absorption spectra shown in FIG. 8 reflect such an effect. The absorption spectrum $l_a$ shown in FIG. 8(a) is obtained in the case where bands are flat as shown in FIG. 7a, and there is a sharp peak $E_H$ at the absorption edge, corresponding to the exciton transition of electrons and heavy holes. On the other hand, when a reversed bias voltage is being applied, the absorption peak $E_H$ shifts to the lower energy side and the height thereof decreases. The second absorption peak $E_L$ that appears in each spectrum corresponds to an exciton transition of electrons and light holes.

The above-mentioned optical modulator with the multiple quantum well is irradiated with light of a wavelength corresponding to energy hγ shown in FIG. 8 through one of the circular windows, and the intensity of light emitted from the other circular window can be modulated by means of an applied voltage. In the situation of FIGS. 7a and 8(a), incident light is almost absorbed into the absorption peak $E_H$ at the band edge, so that the intensity of emitted light becomes small. On the other hand, in the situation of FIGS. 7b and 8(b), the absorption edge peak $E_H$ shifts to the lower energy side and the height thereof decreases, so that the absorbance with respect to the incident light of energy hγ is remarkably decreased, resulting in an increase in the emitted light intensity.

In such an optical modulator, the modulation index of emitted light is determined by the height of the absorption curve on the higher energy side of the peak $E_H$ shown in FIG. 8. There is another absorption peak $E_L$, which corresponds to an exciton transition of electrons and light holes, on the higher energy side of the peak $E_H$, so that when a voltage is applied to the optical modulator, incident light of energy hγ is absorbed into the peak $E_L$. There has been proposed a semiconductor device using the quantum effect of one dimension in which such an influence of the peak $E_L$ is reduced (T. Hayakawa et al. U.S. Pat. application Ser. No. 159,797, U.S. Pat. No. 4,894,836). As an example of this semiconductor device, an optical modulator produced on a (111)-oriented GaAs substrate is disclosed therein, whereas a conventional optical modulator is produced on a (100)-oriented GaAs substrate. FIG. 9 compares photoluminescene excitation spectra of multiple quantum wells above the (100)-oriented and the (111)-oriented substrates at 77K. As seen from this figure, when the (111)-oriented multiple quantum well is used, the energy separation between the peaks $E_H$ and $E_L$ becomes large and the height of the peak $E_H$ is greater than that of the peak $E_L$. This is due to the anisotropy of the heavy-holes band in the [100] and [111] directions. That is, the effective mass of heavy holes in the [111] direction is greater than in the [100] direction and the energy levels of heavy holes rise only slightly from the bottom of the quantum well, so that the peak $E_H$ shifts to the lower energy side, resulting in an increase in the energy separation between the peaks $E_H$ and $E_L$. Moreover, this is because the effective mass of heavy holes in the (111) plane is greater than in the (100) plane, so that the state density of heavy holes within the quantum well becomes large, resulting in an increase in transition probability. The use of such an effect makes it possible to increase the height of the absorption curve on the higher energy side of the peak $E_H$, so that the modulation amplitude of emitted light can be increased.

As a typical example of other conventional optical semiconductor devices, there can be mentioned an optical bistable device utilizing exciton peaks such as a self-electrooptic effect device (SEED) proposed by Miller et al., which is described in detail in the following article: D.A.B. Miller, D.S. Chemla, T.C. Damen, T.H. Wood, C.A. Bvrrus, Tr, A.C. Gossard, and W. Wigmann, "The quantum well self-electrooptic effect device, optoelectronic bistability and oscillation, and self-linearized modulation," IEEE, J. Quantum Electron, vol.Qe-21, pp. 1462(1985).

The operating principle of this optical switch will hereinafter be explained briefly. FIG. 3 shows the optical switch in which the multiple quantum-well device shown in FIG. 6 is connected in series with an external resistor R and a constant reversed bias voltage is applied between both sides of the multiple quantum-well device. When the multiple quantum-well device is irradiated through one of the circular windows with light of photoenergy near the band gap between the band edges at the time when no voltage is applied, an absorption coefficient for incident light at the time when a voltage is applied becomes small because of the Stark effect of the quantum well as shown in FIGS. 7 and 8. Raising the intensity of the incident light increases a photocurrent that arises from the absorption of the incident light, so that while a voltage drop with respect to the external resistor R is increased, a voltage applied to the multiple quantum well is lowered. Therefore, the absorption spectrum of the multiple quantum well at the time when a voltage is applied approaches the absorption spectrum $1a$ shown in FIG. $8(a)$.

When resonance occurs between the energy of incident light and the exciton transition energy of electrons and heavy holes, the absorbance of the multiple quantum well increases, and the amount of emitted light rapidly decreases. Even if the amount of the incident light is lowered under such a condition, optical output power is maintained at a low level because of a large photocurrent that arises from the exciton absorption, resulting in a hysteresis as shown in FIG. 10. In this kind of optical switch, the ON/OFF ratio of bistable output power is determined by the depth of the absorption curve on the higher energy side of the peak $E_H$ shown in FIG. 8. Therefore, a large ON/OFF ratio of the bistable output power can be obtained by use of a (111)-oriented quantum well.

SUMMARY OF THE INVENTION

The optical semiconductor device of this invention, which overcomes the above-discussed and numerous other disadvantages and deficiencies of the prior art, comprises a quantum well structure as an active region and exhibits a nonlinear optical effect with regard to light of energy near the band gap between the allowed band edges in the active region, wherein the quantum well structure is composed of alternate layers consisting of at least one first semiconductor layer with a thickness smaller than the de Broglie wavelength of carriers and at least two second semiconductor layers with a band gap greater than that of the first semiconductor layer, the alternate layers being formed along a crystal orientation in the zinc-blende structure, and wherein the second semiconductor layers are of an indirect transition type.

In a preferred embodiment, the crystal orientation mentioned above is in the [111] direction.

In a preferred embodiment, the second semiconductor layer mentioned above has the composition of $Al_xGa_{1-x}As$ (where $0.45 < x \leq 1$).

Thus, the invention described herein makes possible the objective of providing an optical semiconductor device with excellent characteristics that utilizes the effect of the exciton transition of electrons and heavy holes, such as an optical modulator with a high modulation index and an optical switch with stable switching characteristics at low power, in which multiple quantum-well barrier layers formed along a crystal orientation in the zinc-blende structure are of an indirect transition type, so that the influence of absorption peaks for the exciton transition of electrons and light holes is reduced, resulting in excellent device characteristics.

BRIEF DESCRIPTION OF THE DRAWINGS

This invention may be better understood and its numerous objects and advantages will become apparent to those skilled in the art by reference to the accompanying drawings as follows.

Figure 6:
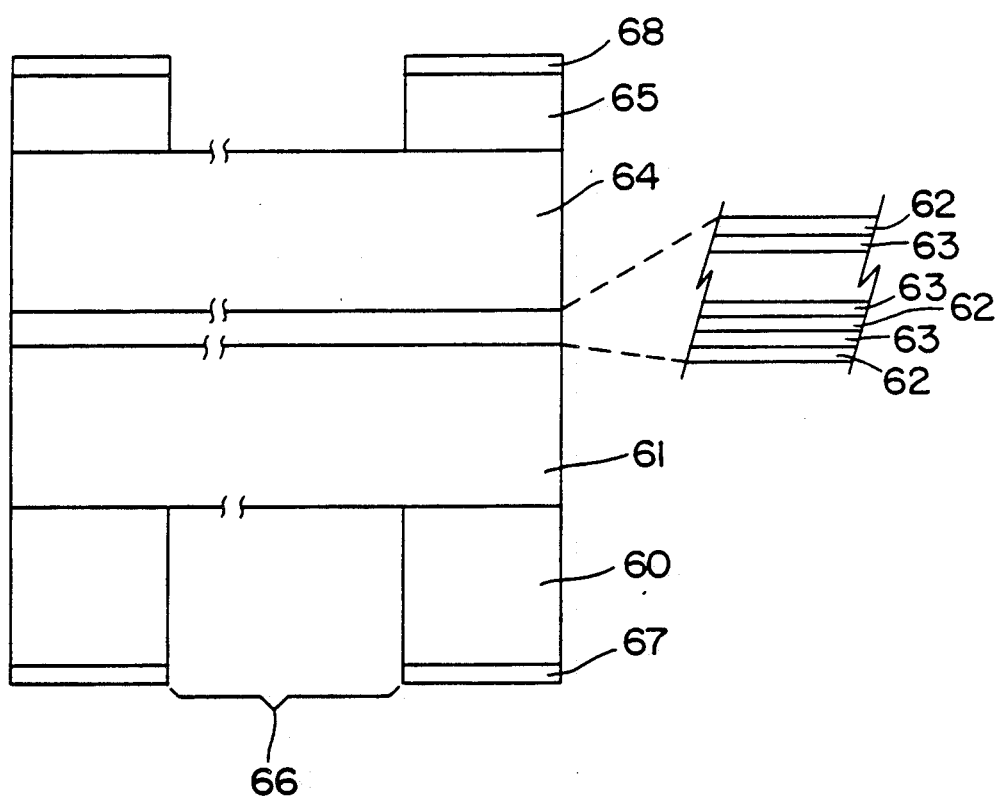
FIG. 6 is a sectional view of the conventional absorption type electric field effect optical modulator.
Figure 7A:
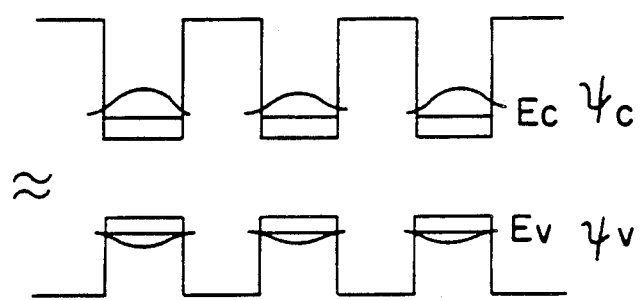
Figure 7B:
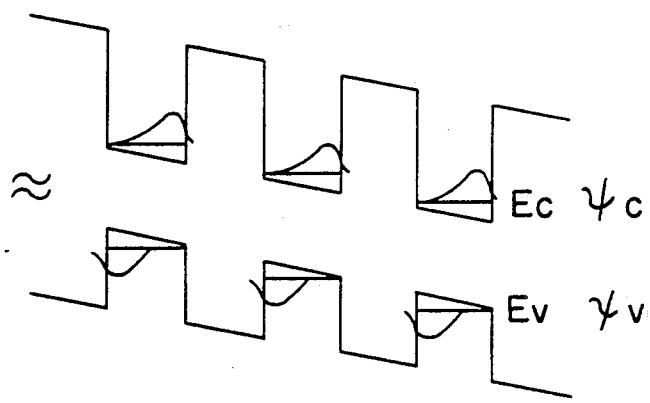

FIGS. $7a$ and $7b$ are schematic diagrams showing the band edges in the multiple quantum well of the optical modulator shown in FIG. 6 when an electric field is applied to the optical modulator.

Figure 8:
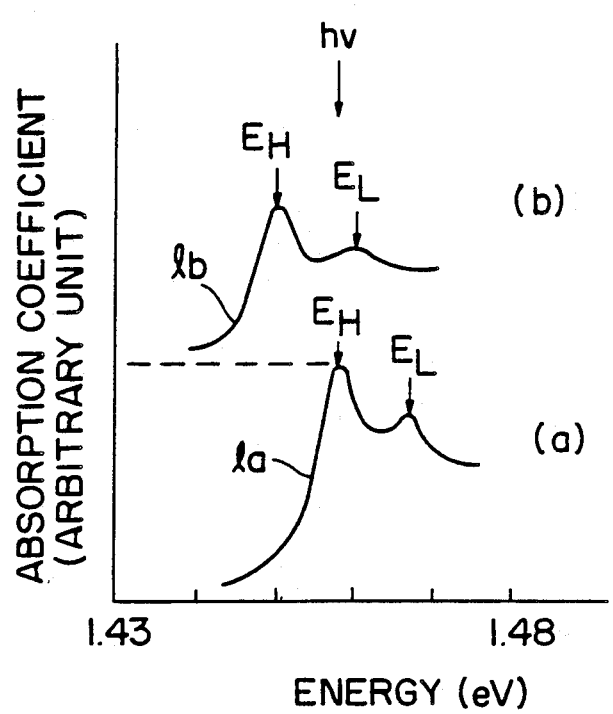

FIG. 8 shows absorption spectra for the multiple quantum well of the optical modulator shown in FIG. 6 when an electric field is applied to the optical modulator.

Figure 9:
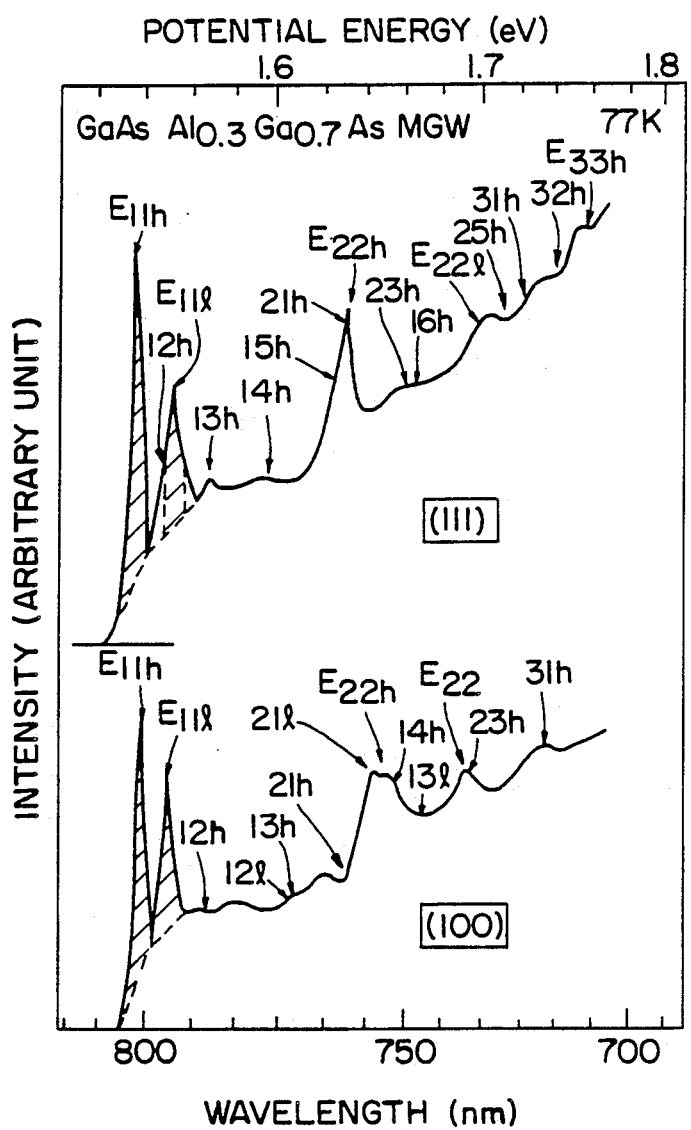

FIG. 9 shows excitation spectra for the (111)-oriented and the (100)-oriented quantum wells.

Figure 10:
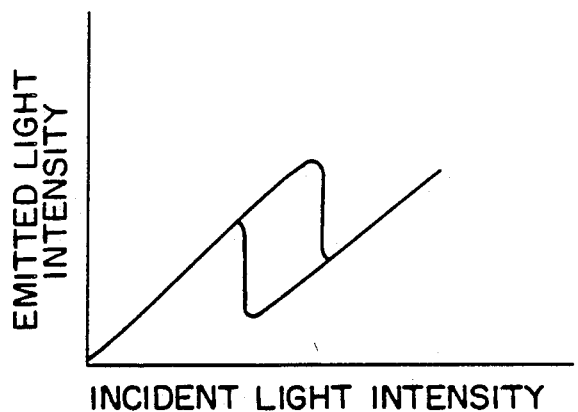

FIG. 10 is of characteristic curves showing the optical bistability of the self-electrooptic effect device.

Figure 11:
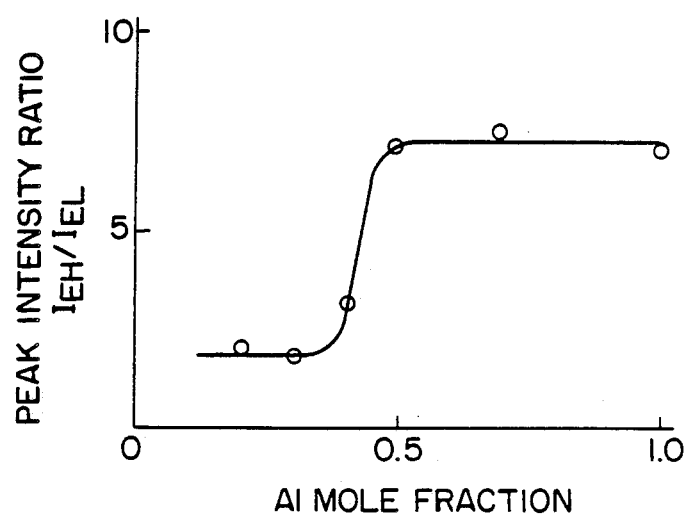

FIG. 11 is of a characteristic curve showing the relationship between the Al mole fraction (i.e., x) in $Al_xGa_{1-x}As$ barrier layers in the (111)-oriented quantum well and the peak intensity ratio, $I_{EH}/I_{EL}$, in the excitation spectra of the (111)-oriented quantum well wherein the peak $E_H$ corresponds to the transition of electrons and heavy holes, and the peak $E_L$ corresponds to the transition of electrons and light holes.

Figure 4:
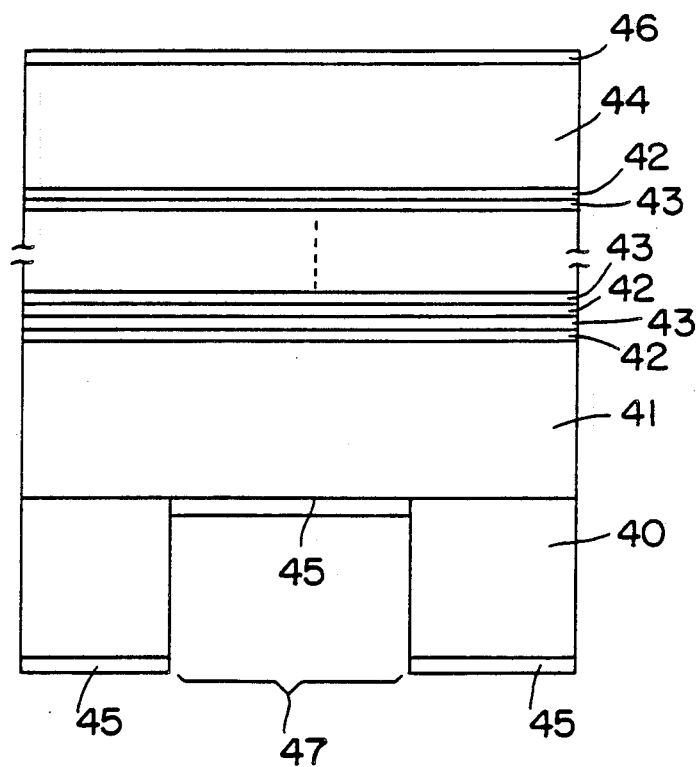
FIG. 4 is a sectional view of the optical bistable device of this invention.
Figure 12:
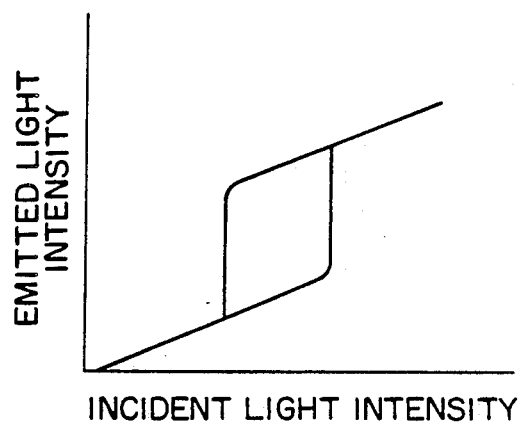

FIG. 12 is of characteristic curves showing the hysteresis characteristics of the optical bistable device shown in FIG. 4.

Figure 5:
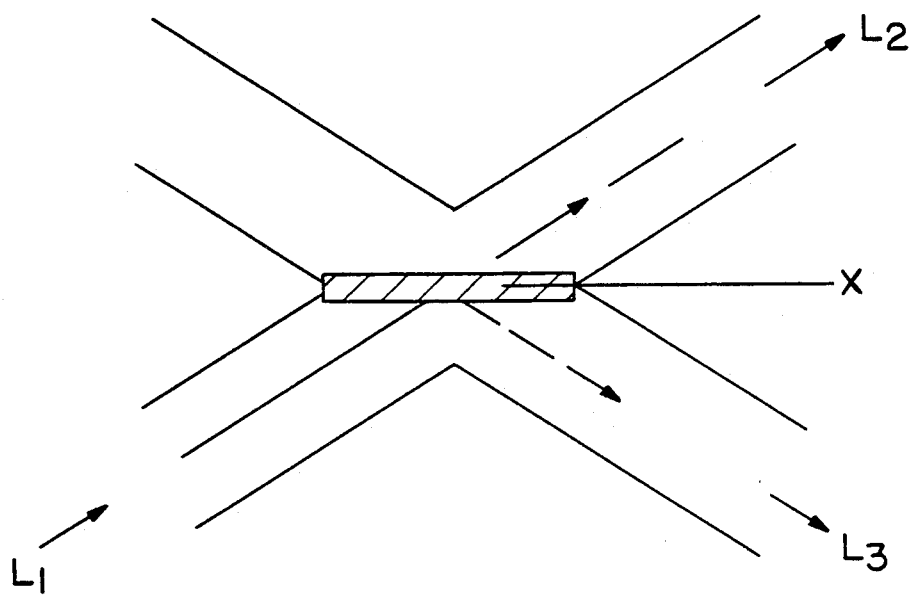
FIG. 5 is a schematic view showing the total reflection type optical switch of this invention.
Figure 13:
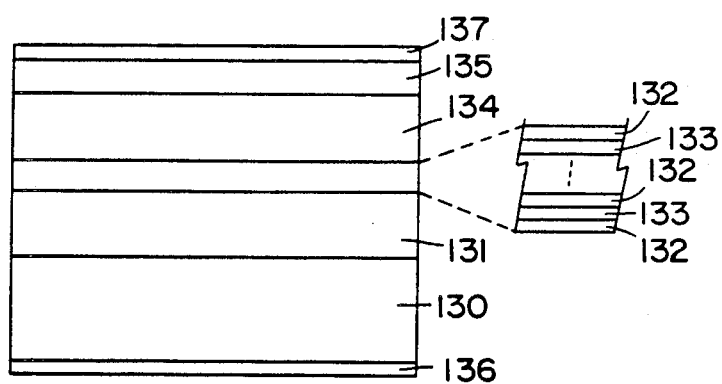

FIG. 13 is a sectional view of the intersecting region of the total reflection type optical switch shown in FIG. 5.

DESCRIPTION OF THE PREFERRED EMBODIMENTS

In any device utilizing the exciton transition of electrons and heavy holes, the energy separation between the peaks $E_H$ and $E_L$ as shown in FIG. 8 can be enlarged by use of a (111)-oriented quantum well. In order to reduce the influence of the peak $E_L$ further, it is desired to raise the intensity ratio between the peaks $E_H$ and $E_L$.

FIG. 11 shows the relationship between the peak intensity ratio (i.e., $I_{EH}/I_{EL}$) and the Al mole fraction in the barrier layers, which relationship is obtained from photoluminescene excitation spectra for the (111)-oriented multiple quantum wells with various Al mole fractions. As seen from this figure, when the Al mole fraction is 0.45 or more, the ratio of the intensity of the peak $E_H$ to that of the peak $E_L$ is considerably increased. If the Al mole fraction in the barrier layers is selected in this region (i.e., $0.45 \leq x \leq 1$), there can be obtained optical semiconductor devices with extremely excellent characteristics.

EXAMPLE 1

Figure 1:
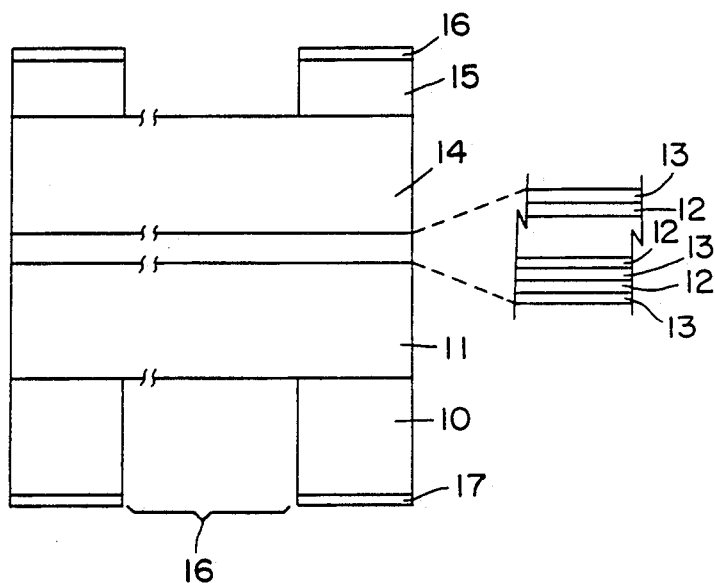
FIG. 1 is a sectional view of the absorption type electric field effect optical modulator of this invention, including a sectional view of the multiple quantum well of the self-electrooptic effect device of this invention.

FIG. 1 shows an absorption type electric field effect optical modulator of this invention, which is produced as follows: On the plane of an n-GaAs substrate 10 that is inclined from the (111) plane at an angle of 0.5 degrees, an n-$Al_{0.3}Ga_{0.7}As$ layer 11, a multiple quantum-well layer (composed of alternate layers consisting of forty-nine undoped GaAs well layers 12 of a thickness of 100 Å each and fifty undoped AlAs barrier layers 13 of a thickness of 100 Å each), a p-$Al_{0.3}Ga_{0.7}As$ layer 14, and a p-GaAs layer 15 are successively grown by molecular beam epitaxy or the like.

Then, by photolithography and chemical etching techniques, the central portion of each of the n-GaAs substrate 10 and the p-GaAs layer 15 is removed into a circular shape with a diameter of 200 μm, and a p-sided electrode 16 and an n-sided electrode 17 are disposed on the upper face of the p-GaAs layer 15 and the back face of the n-GaAs substrate 10, respectively.

The resulting optical modulator is irradiated with monochromatic light, which is emitted from another laser light source and has a wavelength of 848 nm, through one of the circular windows, and the intensity of emitted light through the other circular window is modulated by the application of a reversed bias voltage to the multiple quantum well layer. The wavelength of the incident light corresponds to an energy gap between the band edges of the multiple quantum-well layer with no voltage.

As a reference standard, an absorption type electric field effect optical modulator with a multiple quantum-well layer composed of alternate layers consisting of forty-nine undoped GaAs well layers and fifty undoped $Al_{0.3}Ga_{0.7}As$ barrier layers was produced on the (100) plane of an n-GaAs substrate as shown in FIG. 6, and another absorption type electric field effect optical modulator with the same structure as that of FIG. 6 was produced on the (111) plane of an n-GaAs substrate.

As a result, the modulation amplitude of the optical modulator Of this example was four times as large as that of the optical modulator with the multiple quantum-well layer comprising the $Al_{0.3}Ga_{0.7}As$ barrier layer above the (100)-oriented substrate and was two times as large as that of the optical modulator with the multiple quantum-well layer comprising the undoped $Al_{0.3}Ga_{0.7}As$ barrier layer above the (111)-oriented substrate.

EXAMPLE 2

Figure 2:
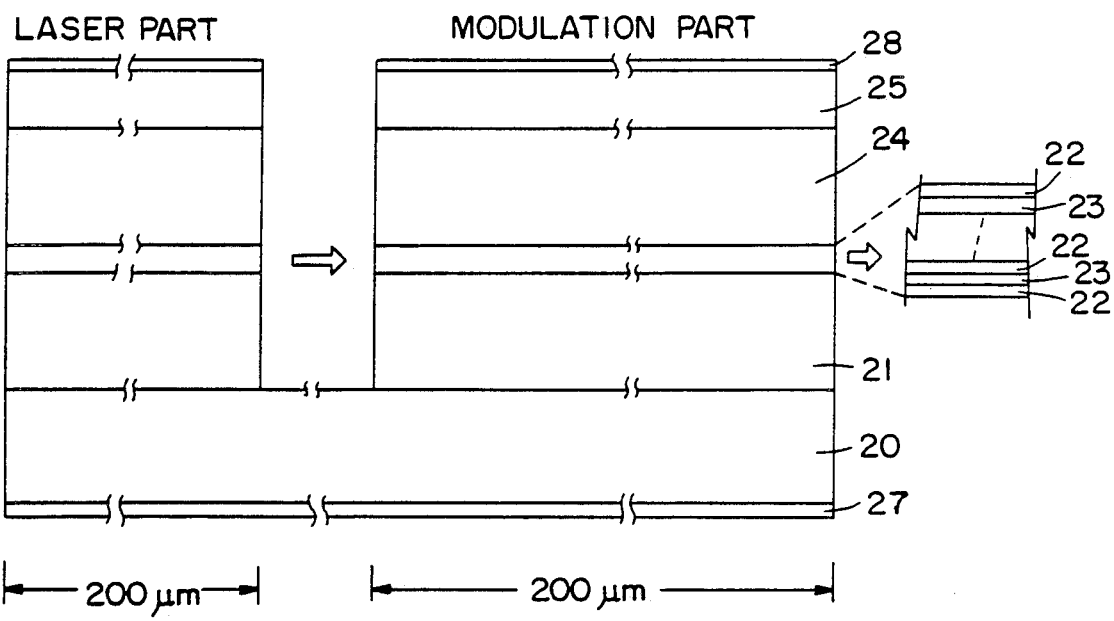
FIG. 2 is a sectional view of the laser type electric field effect optical modulator of this invention.

FIG. 2 shows a laser type electric field effect optical modulator of this invention, which was produced as follows: On a (111)-oriented n-GaAs substrate 20, an n-$Al_{0.75}Ga_{0.25}As$ layer 21, a multiple quantum-well layer (composed of alternate layers consisting of ten undoped $Al_{0.2}Ga_{0.8}As$ well layers 22 of a thickness of 100 Å each and nine undoped $Al_{0.5}Ga_{0.5}As$ barrier layers 23 of a thickness of 40 Å each), a p-$Al_{0.75}Ga_{0.25}As$ layer 24, and a p-GaAs layer 25 were successively grown by molecular beam epitaxy.

Then, by a reactive ion-beam etching technique, the semiconductor growth layers on the n-GaAs substrate were selectively etched as shown in FIG. 2, so that a laser oscillation part and a modulation part were formed separately from each other. The laser oscillation part and the modulation part had a width of 30 μm and a length of 200 μm. Next, an n-sided electrode 27 and p-sided electrodes 28 were formed on the back face of the n-GaAs substrate and on the upper face of the p-GaAs layers 25 of the laser oscillation part and the modulation part, respectively.

The laser light emitted from the laser oscillation part by current flowing in the forward direction is modulated, while being guided in the modulation part, by the application of a reversed bias voltage thereto, and is emitted from the modulation part.

As a reference standard, a laser type electric field effect optical modulator with a different structure from that of FIG. 2 was produced as follows: On a (111)-oriented n-GaAs substrate, an n-$Al_{0.55}Ga_{0.45}As$ layer, a multiple quantum layer (composed of alternate layers consisting of ten undoped GaAs well layers of a thickness of 100 Å each and nine undoped $Al_{0.3}Ga_{0.7}As$ barrier layers of a thickness of 40 Å each), a p-$Al_{0.55}Ga_{0.45}As$ layer, and a p-GaAs layer were successively grown by molecular beam epitaxy. Thereafter, the optical modulator was finished in the same way as that of the above-mentioned example of FIG. 2.

The modulation amplitude of the optical modulator of this example was compared with that of the reference standard optical modulator, and it was found that the former was two times as large as the latter. This is because the Al mole fraction (i.e., $x = 0.5$) in the multiple quantum-well barrier layer of the optical modulator of this invention is higher than that of the reference standard optical modulator, so that the exciton absorption effect by electrons and light holes is reduced.

EXAMPLE 3

Figure 3:
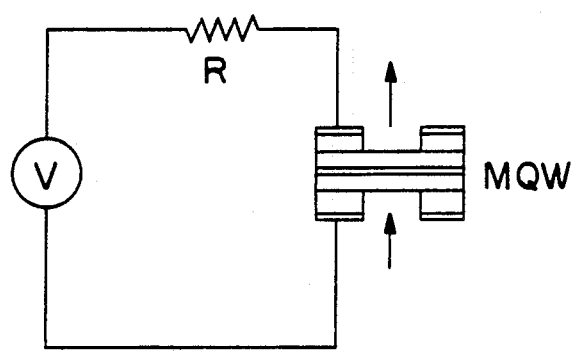
FIG. 3 is a schematic view showing the constitution of the self-electrooptic effect device.

The self-electrooptic effect device of this invention will hereinafter be explained with reference to FIGS. 1 and 3. As shown in FIG. 3, a pin device with the same multiple quantum-well structure as that of Example 1 shown in FIG. 1 is connected to an external resistor R with a resistance of 1 MΩ, and is also connected to a power source with a constant voltage of 20 volts so that a reversed bias voltage is applied to the multiple quantum-well layer of this pin device.

When the device is irradiated with light having a wavelength of 855 nm through one of the circular windows, the light emitted from the other circular window shows bistable characteristics as shown in FIG. 10.

As a reference standard, a self-electrooptic effect device using the optical modulator with the multiple quantum-well comprising the undoped $Al_{0.3}Ga_{0.7}As$ barrier layers as shown in FIG. 6 was produced.

The ON/OFF ratio of output power in the bistable state of the self-electrooptic effect device of this example was two times as large as that of the reference standard device. This is because the Al mole fraction (i.e., $x=0.5$) in the multiple quantum-well barrier layer of the self-electrooptic effect device of this invention is higher than that of the reference standard device. This is because the Al mole fraction (i.e., $x=0.5$) in the multiple quantum-well barrier layer of the self-electrooptic effect device of this invention is higher than that of the reference standard device, resulting in a weak absorption at the peak $E_L$ of the spectra shown in FIG. 8.

EXAMPLE 4

FIG. 4 shows an optical bistable device utilizing nonlinear exciton absorption, which was produced as follows: On a (111)-oriented GaAs substrate 40, an $Al_{0.7}Ga_{0.3}As$ etching stop layer 41 (the thickness thereof being 0.2 μm), a multiple quantum-well layer (composed of alternate layers consisting of sixty GaAs well layers 42 of a thickness of 340 Å each and fifty-nine $Al_{0.7}Ga_{0.3}As$ barrier layers 43 of a thickness of 400 Å each), and an $Al_{0.7}Ga_{0.3}As$ layer 44 were successively grown by molecular beam epitaxy.

Then, by photolithography and selective chemical etching techniques, the central portion of the GaAs substrate 40 was removed into a circular window with a diameter of 2 mm. The back face of the GaAs substrate 40 and the $Al_{0.7}Ga_{0.3}As$ layer 41 inside the circular window was coated with a dielectric 45, and the upper face of the $Al_{0.7}Ga_{0.3}As$ layer 44 was coated with a dielectric 46.

When the device was irradiated with laser light having a wavelength of 880 nm from one side thereof, the emitted light intensity showed hysteresis characteristics with respect to the incident light intensity as shown in FIG. 12, due to saturation of exciton absorption.

As a reference standard, an optical bistable device with $Al_{0.3}Ga_{0.7}As$ layers used as the multiple quantum-well barrier layers was produced. The minimum input power in the hysteresis range required for the optical bistable device of this example was reduced at the level of 20% as compared with the reference standard optical bistable device.

EXAMPLE 5

FIG. 5 shows a total reflection type optical switch in which by changing the refractive index at an intersecting region x between two optical waveguides, incident light $L_1$ is transmitted or reflected in the desired direction $L_2$ or $L_3$. The basic principle of such an optical switch is described in detail in the following article: C. S. Tsai, B. Kim, F. R. El-Akkari, "Optical channel waveguide switch and coupler using total internal reflection," IEEE, J. Quantum Electron, vol. QE-14, pp. 513 (1978).

As a method for changing the refractive index at an intersecting region x of such an optical switch, there is a well known method in which a multiple quantum-well layer is formed at the intersecting region and the refractive index of the layer is controlled by means of a voltage applied thereto. Such a method is described in detail in the following article: N. Nagai, Y. Kan, M. Yamanishi, and I. Suemune, "Electroreflectance spectra and field induced variation in refractive index of a GaAs/AlAs quantum well structure at room temperature," Jpn. J. Appl. Phys., vol. 125, pp. L640 (1986).

FIG. 13 shows the structure of the multiple quantum-well layer of the optical switch of this example, which is produced as follows: On the plane of an n-GaAs substrate 130 that is inclined from the (111) plane at an angle of 0.5 degrees, an $n-Al_{0.6}Ga_{0.4}As$ layer 131, a multiple quantum-well layer (composed of alternate layers consisting of fifty undoped GaAs well layers 132 of a thickness of 100 Å each and forty-nine undoped $Al_{0.6}Ga_{0.4}As$ barrier layers 133 of a thickness of 200 Å each), a $p-Al_{0.6}Ga_{0.4}As$ layer 134 and a p-GaAs layer 135 are successively grown by molecular beam epitaxy or the like. Then, an n-sided electrode 136 and a p-sided electrode 137 are formed on the back face of the n-GaAs substrate 130 and the upper face of the p-GaAs layer 135, respectively.

When no voltage is applied between the electrodes 136 and 137, incident light $L_1$ is transmitted in the direction $L_2$ as shown in FIG. 5. When a reversed bias voltage is applied across the multiple quantum-well layer, the refractive index at the intersecting region between two optical waveguides is descreased, so that the incident light $L_1$ is totally reflected in the direction $L_3$ as shown in FIG. 5.

As a reference standard, a total reflection type optical switch with undoped $Al_{0.4}Ga_{0.6}As$ layers used as the multiple quantum-well barrier layers were produced. The optical switch of this example provided a higher reflective index at a lower voltage applied thereto than that of the reference standard optical switch. This is because the influence of peaks $E_L$ in the absorption spectrum shown in FIG. 8 is reduced.

Although the above-mentioned examples disclose only optical semiconductor devices in which $Al_xGa_{1-x}As$ layers (where $0.45 < x \leq 1$, that is, these layers have the composition of an indirect transition type) are used as multiple quantum-well barrier layers, the composition of barrier layers is not limited thereto, but any barrier layers of an indirect transition type can be used in the multiple quantum-well layer, which is composed of III-V group semiconductor layers grown in the [111] direction, to attain the same quantum effect. For example, the multiple quantum-well layer can be composed of $(Al_xGa_{1-x})_{0.51}In_{0.49}P$ layers (where $0 \leq x \leq 0.67$) as well layers and $(Al_{x'}Ga_{1-x'})_{0.51}In_{0.49}P$ layers (where $0.67 \leq x \leq 1$) as barrier layers, both of which are alternately grown on a (111)-oriented GaAs substrate.

Moreover, when the thickness of each layer is small as in the multiple quantum-well layer, even if there is a mismatch between the lattice constants, semiconductor crystal layers with high quality can be obtained. Therefore, the multiple quantum-well layer composed of alternate layers consisting of $(Al_xGa_{1-x})_{0.47}In_{0.53}As$ layers as well layers and $(Al_{x'}Ga_{1-x'})_{y'}In_{1-y'}As$ layers of an indirect transition type (e.g., $Al_yIn_{1-y}As$ where $0.68 \leq$ y' ≦ 1) as barrier layers, the alternate layers being grown on a (111)-oriented InP substrate, and the multiple quantum-well layer composed of alternate layers consisting of $Al_xGa_{1-x}Sb$ layers (where $x ≦ 0.2$) as well layers and $Al_{x'}Ga_{1-x'}Sb$ layers (where $0.2 ≦ x' ≦ 1$) as barrier layers, the alternate layers being grown on a (111)-oriented GaSb substrate, can be used to attain the same quantum effect.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A quantum-well structure in an optical semiconductor device wherein an electric field is applied to said quantum-well structure so as to modulate the band gap of said quantum-well structure, said quantum well structure comprising at least one semiconductor well layer with a thickness smaller than the de Broglie wavelength of carriers and at least two semiconductor barrier layers with a band gap greater than that of said semiconductor well layer, said well and barrier layers being alternately formed along a crystal orientation in the zinc-blende structure, and wherein said semiconductor barrier layers are of an indirect transition type.

2. A quantum-well structure according to claim 1, wherein said crystal orientation is the direction.

3. A quantum-well structure according to claim 1, wherein said semiconductor barrier layer has the composition of $Al_xGa_{1-x}As$ (where $0.45 ≦ x ≦ 1$).

* * * * *